US012659259B2

(12) United States Patent
Lee

(10) Patent No.: US 12,659,259 B2
(45) Date of Patent: Jun. 16, 2026

(54) INFORMATION PROCESSING SYSTEM, INFORMATION PROCESSING METHOD, AND INFORMATION PROCESSING APPARATUS TO INSTRUCT GENERATION AND DESTRUCTION OF A PLURALITY OF APPLICATION CONTAINERS

(71) Applicant: TOYOTA JIDOSHA KABUSHIKI KAISHA, Toyota (JP)

(72) Inventor: Chunghan Lee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/379,694

(22) Filed: Oct. 13, 2023

(65) Prior Publication Data

US 2024/0137304 A1    Apr. 25, 2024
US 2024/0235981 A9    Jul. 11, 2024

(30) Foreign Application Priority Data

Oct. 21, 2022    (JP) ................................. 2022-169066

(51) Int. Cl.
*G06F 15/173*       (2006.01)
*G06F 9/445*        (2018.01)
*H04L 45/00*        (2022.01)
*H04L 45/02*        (2022.01)

(52) U.S. Cl.
CPC .......... *H04L 45/02* (2013.01); *G06F 9/44594* (2013.01); *H04L 45/34* (2013.01)

(58) Field of Classification Search
CPC ........... H04L 45/02; G06F 2009/45562; G06F 2009/4557
See application file for complete search history.

(56) References Cited

U.S. PATENT DOCUMENTS

2020/0250006 A1* 8/2020 Parekh ................ H04L 67/1008
2021/0328913 A1* 10/2021 Nainar .................. H04L 45/745
2021/0397356 A1* 12/2021 Cain ........................ G06F 3/065

OTHER PUBLICATIONS

The Kubernetes Authors, 2023 The Linux Foundation, Kubernetes, https://kubernetes.io/, available at least as early as Sep. 16, 2022.

* cited by examiner

*Primary Examiner* — Padma Mundur
(74) *Attorney, Agent, or Firm* — Dinsmore & Shohl LLP

(57) ABSTRACT

An information processing system comprises a master apparatus configured to instruct generation and destruction of a plurality of application containers that operate in a plurality of node apparatuses, respectively, and a route control apparatus configured to control routing among the plurality of node apparatuses, wherein the master apparatus comprises a first processor configured to execute: receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus; and the route control apparatus comprises a second processor configured to, when receiving the second message, execute generating route information about routes among the plurality of node apparatuses.

20 Claims, 12 Drawing Sheets

FIG.2

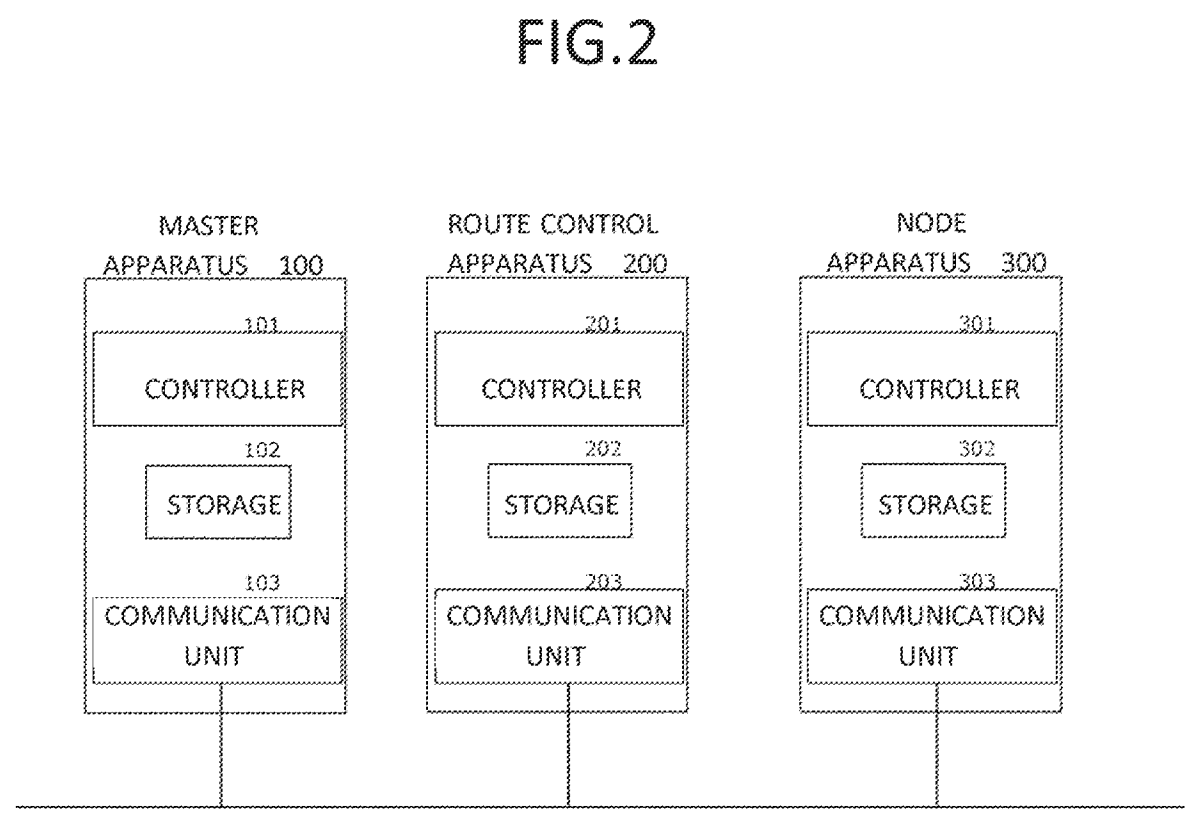

MASTER APPARATUS 100
- 101 CONTROLLER
- 102 STORAGE
- 103 COMMUNICATION UNIT

ROUTE CONTROL APPARATUS 200
- 201 CONTROLLER
- 202 STORAGE
- 203 COMMUNICATION UNIT

NODE APPARATUS 300
- 301 CONTROLLER
- 302 STORAGE
- 303 COMMUNICATION UNIT

FIG.3A

MASTER APPARATUS
100

1011

API SERVER

1012

PROXY

1013

API MONITORING UNIT

FIG.4A

ROUTE CONTROL APPARATUS
200

2011

CONTAINER STATE
MONITORING
UNIT

2012

ROUTE
CONTROLLER

FIG.5

INFORMATION PROCESSING SYSTEM, INFORMATION PROCESSING METHOD, AND INFORMATION PROCESSING APPARATUS TO INSTRUCT GENERATION AND DESTRUCTION OF A PLURALITY OF APPLICATION CONTAINERS

CROSS REFERENCE TO THE RELATED APPLICATION

This application claims the benefit of Japanese Patent Application No. 2022-169066, filed on Oct. 21, 2022, which is hereby incorporated by reference herein in its entirety.

BACKGROUND

Technical Field

The present disclosure relates to distributed computing.

Description of the Related Art

Recently, technologies for performing distributed processing using microservices have been widespread. As a technique related thereto, for example, "Kubernetes" (https://kubernetes.io/; searched on Sep. 16, 2022) discloses an orchestration technique for containerizing and deploying an application.

SUMMARY

An object of the present disclosure is to improve performance of communication among application containers.

The present disclosure in its one aspect provides an information processing system comprising a master apparatus configured to instruct generation and destruction of a plurality of application containers that operate in a plurality of node apparatuses, respectively, and a route control apparatus configured to control routing among the plurality of node apparatuses, wherein the master apparatus comprises a first processor configured to execute:

receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus; and the route control apparatus comprises a second processor configured to, when receiving the second message, execute generating route information about routes among the plurality of node apparatuses.

The present disclosure in its another aspect provides an information processing method executed by a master apparatus configured to instruct generation and destruction of a plurality of application containers that operate in a plurality of node apparatuses, respectively, and a route control apparatus configured to control routing among the plurality of node apparatuses, wherein the master apparatus executes:

receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus; and when receiving the second message, the route control apparatus executes generating route information about routes among the plurality of node apparatuses.

The present disclosure in its another aspect provides an information processing apparatus instructing generation and destruction of a plurality of application containers that operate in a plurality of node apparatuses, respectively, the information processing apparatus comprising a processor configured to execute:

receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus configured to generate route information about routes among the plurality of node apparatuses.

As another aspect, a program for causing a computer to execute the above method or a computer-readable storage medium that non-transitorily stores the program is given.

According to the present disclosure, it becomes possible to improve performance of communication among application containers.

BRIEF DESCRIPTION OF THE DRAWINGS

FIG. 2 is a hardware configuration diagram of each apparatus included in the system;

FIG. 3A is a configuration diagram of modules of a master apparatus;

FIG. 4A is a configuration diagram of modules of a route control apparatus;

FIG. 5 is a diagram illustrating a packet transfer route;

DESCRIPTION OF THE EMBODIMENTS

Figure 1:
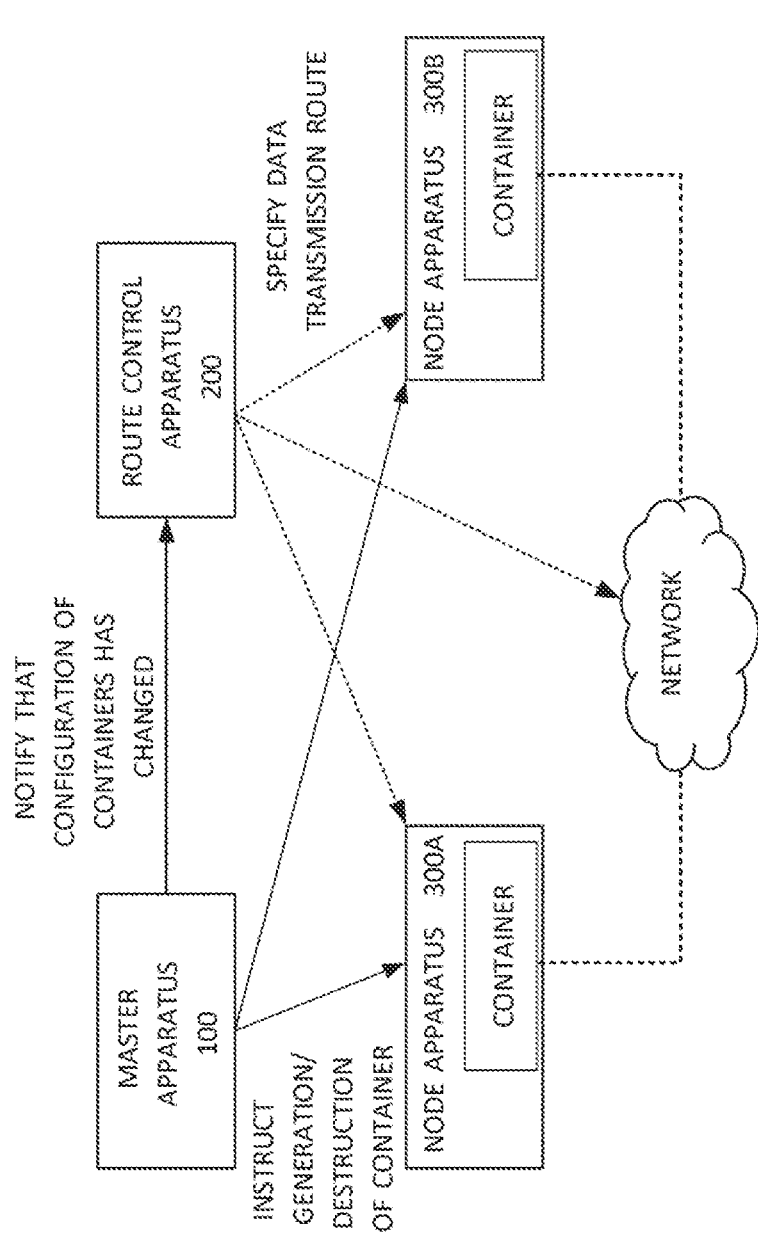
FIG. 1 is a schematic diagram of a communication system according to a first embodiment.

A microservice architecture is known. The microservice architecture is an architecture in which an application provided for a user is divided in a plurality of independent small-scale applications (hereinafter, microservice applications), and the microservice applications are distributedly executed among a plurality of nodes.

For example, by using the orchestration system described in "Kubernetes" (https://kubernetes.io/; searched on Sep. 16, 2022), it becomes possible to cause the microservice applications to cooperate with one another to perform processing.

In such a system, a plurality of nodes in which the applications are executed are tunnel-connected via a virtual network, and the applications mutually perform communication via virtual transmission lines. In such a configuration, however, it is not possible to know a situation of a physical network from the applications. That is, even if a failure or congestion occurs on a data transfer route, it is difficult to appropriately reset a route to avoid the failure or congestion.

An information processing system according to the present disclosure solves such a problem.

An information processing system according to one aspect of the present disclosure is an information processing system comprising a master apparatus configured to instruct generation and destruction of a plurality of application containers that operate in a plurality of node apparatuses, respectively, and a route control apparatus configured to control routing among the plurality of node apparatuses, wherein the master apparatus comprises a first controller configured to execute: receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus; and the route control apparatus comprises a second controller configured to, when receiving the second message, execute generating route information about routes among the plurality of node apparatuses.

The master apparatus is an apparatus that instructs each of the plurality of node apparatuses to generate or destroy an application container. Each of the plurality of node apparatuses executes generation or destruction of an application container based on the instruction. Thereby, in the information processing system according to the present disclosure, it is possible to dynamically increase or decrease the number of nodes to perform information processing.

The first controller of the master apparatus receives the first message requesting generation or destruction of an application container in the first node apparatus.

The first message may be received from an external apparatus or may be transmitted and received inside the master apparatus. For example, the first message may be generated based on an operator's instruction or may be generated by a scheduler or the like operating inside the master apparatus.

The master apparatus detects that generation or destruction of the application container has been requested, based on the first message.

When detecting that generation or destruction of an application container has been requested for any of the node apparatuses, the master apparatus instructs the node apparatus to generate or destroy the application container and transmits the second message to the route control apparatus. The second message is a message notifying that the configuration of the application containers operating in the plurality of node apparatuses, that is, arrangement places, the number, or the like of the application containers have changed.

The route control apparatus is an apparatus that controls communication routing among the plurality of node apparatuses.

Here, when the configuration of the application containers operating in the plurality of node apparatuses changes, an appropriate communication route between node apparatuses may change. In some embodiments, for example, when an application container that performs a lot of communication is newly generated, a route through which the communication passes may be separated from routes used by the other application containers. When an application container that has been performing communication is destroyed, a sufficient communication capacity becomes available on a route that has been used by the application container, and, therefore, other communications can be allocated to the route.

For this, the route control apparatus has to grasp that the configuration of the application containers has changed, at an appropriate timing.

Therefore, the route control apparatus according to the present disclosure generates the route information about routes among the plurality of node apparatuses, being triggered by receiving the second message. In some embodiments, the route information is information about routes for the plurality of application containers to communicate with one another. In some embodiments, the route information may be information in which a communication route is written for each combination of node apparatuses among the plurality of node apparatuses in which application containers are present (are operating).

In the information processing system according to the present disclosure, the master apparatus notifies the route control apparatus that the configuration of the application containers operating in the plurality of node apparatuses has changed, and the route control apparatus generates or regenerates the route information based thereon. Thereby, it is possible to, in the system in which the plurality of application containers are operating, update the route information at an appropriate timing. In some embodiments, by updating the route information at an appropriate timing, the communication performance among the application containers can be kept in a desirable state.

The route control apparatus may execute a predetermined process for controlling transfer routes for data transmitted and received by the plurality of application containers, based on the generated route information.

For example, the route control apparatus may transmit first data for controlling the communication routes to the plurality of node apparatuses. The first data is, for example, data for performing route control in a physical network and for performing segment routing.

Further, the route control apparatus may acquire container information that includes information about operation situations of the application containers in the plurality of node apparatuses. The container information is data, for example, showing what application container is operating in which node. The container information may include information about a communication situation of each application container (for example, communication statistics).

Further, the route information may be generated or regenerated based on the container information. For example, if it is detected that congestion or a failure has occurred in a certain node based on the container information, the route control apparatus can regenerate a route avoiding the node.

Specific embodiments of the present disclosure will be described below based on drawings. A hardware configuration, a module configuration, a function configuration, and the like described in each embodiment are not intended to limit the technical scope of the disclosure only thereto unless otherwise stated.

First Embodiment

An embodiment of the present disclosure will be described below with reference to drawings.

A communication system according to the present embodiment is a system in which a plurality of node apparatuses (information processing apparatuses) distributingly execute particular information processing.

FIG. 1 is a schematic diagram of the communication system according to the present embodiment.

The communication system according to the present embodiment includes a master apparatus 100, a route control apparatus 200, and a plurality of node apparatus 300. Though two node apparatuses 300A and 300B are illustrated as the node apparatuses 300 in the illustrated example, three of more node apparatuses 300 may be included in the system.

In the communication system according to the present embodiment, a task is distributedly executed by the plurality of node apparatuses 300 communicating with one another. The plurality of node apparatuses 300 may be fixed computers or may be mobile computers. For example, by mounting the plurality of node apparatuses 300 on vehicles, it becomes possible to perform distributed processing of a task that occurs while the vehicles are traveling, by a plurality of vehicles traveling around.

In each of the plurality of node apparatuses 300, a microservice application programmed to process a predetermined task is executed.

The plurality of node apparatuses 300 may have parent-child relationships. A node apparatus 300 which is a parent node may request a subordinate node apparatus 300 to perform processing of a task. The node apparatus 300 requested to perform processing of the task may request another node apparatus 300 to perform processing of (a part or all of) the task. Further, each node apparatus 300 may execute a different type of task.

As an infrastructure enabling such processing, Kubernetes is known. In Kubernetes, a plurality of microservices operate in application containers. In computers in which Kubernetes operates, virtual network interfaces operate, and unique IP addresses are assigned to the application containers. By transmitting requests by HTTP to the application containers, task processing can be requested to the microservices.

The master apparatus 100 is an apparatus that controls generation and destruction of an application container that operates in each node apparatus 300. In the communication system in the present embodiment, the number of containers in which applications operate is dynamically changed based on an instruction from the master apparatus 100. For example, if determining that more calculation resources are necessary, the master apparatus 100 issues instructions to generate an application container, to more node apparatuses 300. Further, if a calculation resource becomes unnecessary, the master apparatus 100 issues an instruction to destroy an unnecessary application container, to a corresponding node apparatus 300.

Each node apparatus 300 executes generation and destruction of the container based on an instruction transmitted from the master apparatus 100.

Thereby, it is possible to dynamically control calculation resources of the whole system.

In such a communication system, selection of an appropriate communication route is a problem.

In Kubernetes, a plurality of application containers perform communication via a virtual network. In such a configuration, it is impossible to know the situation of a physical network from the application containers because the application containers mutually perform communication via virtual transmission lines. That is, even if a failure or congestion occurs on a data transfer route, it is difficult to appropriately reset a route to avoid the failure or congestion.

Furthermore, a network situation can change according to the arrangement situation of the application containers.

In some embodiments, for example, when an application container that performs a lot of communication is newly generated, a route through which the communication passes may be separated from routes used by the other application containers. When an application container that has been performing a lot of communication is destroyed, a sufficient communication capacity becomes available on a route that has been used by the application container, and, therefore, other communications can be allocated to the route.

Therefore, in the communication system according to the present embodiment, the route control apparatus 200, which is an apparatus that acquires a network situation, is provided, and the route control apparatus 200 generates route information about routes among the plurality of node apparatuses 300 and then issues information for specifying data transmission routes to the plurality of node apparatuses 300.

Further, the route control apparatus 200 generates the route information being triggered by change in the arrangement situation of the application containers in the plurality of node apparatuses 300. It is detected by the master apparatus 100 that the arrangement situation of the application containers has changed, and the route control apparatus 200 is notified thereof.

The route control apparatus 200 may be a controller in a software-defined network (an SDN controller) or may be implemented as a container in Kubernetes. In this case, the functions may be distributedly implemented in a plurality of containers.

According to such a configuration, it becomes possible to cause the route control apparatus 200 to generate or update the route information, following change in the arrangement situation of the application containers. Further, it becomes possible to specify data transmission routes to the plurality of node apparatuses 300 based on the route information.

Hardware configurations of the master apparatus 100, the route control apparatus 200, and each node apparatus 300 according to the present embodiment will be described with reference to FIG. 2.

Each of the master apparatus 100, the route control apparatus 200, and the plurality of node apparatuses 300 can be configured with a computer that includes a CPU (an arithmetic processing device), a main memory, and an auxiliary storage device. All or a part of the illustrated functions may be executed by dedicatedly designed circuits.

The master apparatus 100 includes a controller 101, a storage 102, and a communication unit 103.

The route control apparatus 200 includes a controller 201, a storage 202, and a communication unit 203.

Each node apparatus 300 includes a controller 301, a storage 302, and a communication unit 303.

The controller 101 is an arithmetic unit that realizes various kinds of functions of the master apparatus 100 by executing a predetermined program. The controller 201 is an arithmetic unit that realizes various kinds of functions of the route control apparatus 200 by executing a predetermined program. The controllers 301 are arithmetic units that realize various kinds of functions of the node apparatuses 300, by executing a predetermined program. Each of the controllers 101, 202, and 301 may be realized, for example, by a CPU.

Each of the storages 102, 202, and 302 is device for storing information and is configured with a storage medium such as a RAM, a magnetic disk, or a flash memory. In the storages 102, 202, and 302, various kinds of programs executed by the controllers 101, 201, and 301, data used by the programs, and the like are stored.

The communication units 103, 203, and 303 are communication interfaces for connecting the master apparatus 100, the route control apparatus 200, and the plurality of node apparatuses 300 to a network, respectively. Each of the communication units 103, 203, and 303 includes, for example, a network interface board, a wireless communication interface for wireless communication.

Next, functions executed by each apparatus will be described for function modules, respectively.

Figure 3A:
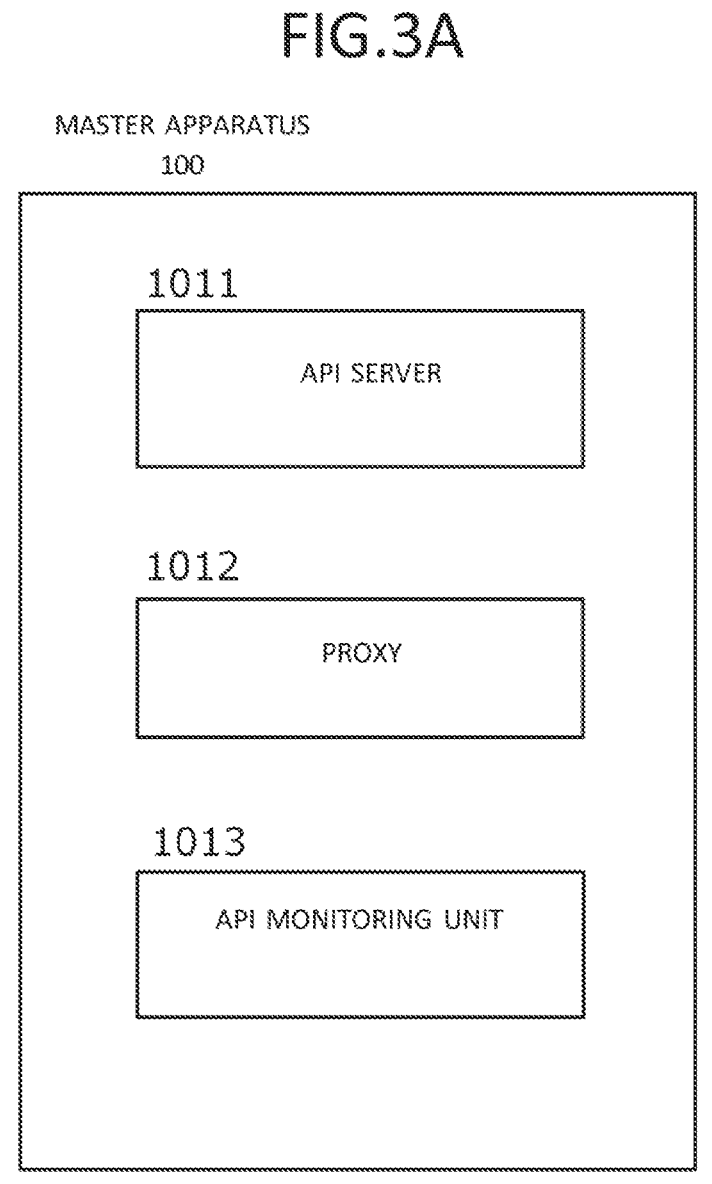

FIG. 3A is a schematic diagram illustrating function modules of the master apparatus 100. Each of the illustrated function modules is executed by the controller 101.

An API server 1011 is a server that instructs each of the plurality of node apparatuses 300 to perform generation and destruction of an application container. In Kubernetes, various kinds of instructions to each application container are issued using a predetermined API (typically, an HTTP (Hypertext Transfer Protocol) API).

The API server 1011 receives a request for control of an application container (hereinafter, a container operation request) from outside the apparatus, and issues an instruction about the application container to a corresponding node apparatus 300 based on the request.

The container operation request is typically a request for generating an application container or a request for destroying an application container, but other requests may be included. The container operation request includes a message for calling an HTTP API.

Furthermore, the API server 1011 has a function of managing configuration information about application containers. Specifically, by communication with the node apparatuses 300, the API server 1011 acquires information about the states of the node apparatuses 300. Thereby, the API server 1011 can grasp what application container is operating in which node apparatus 300. Further, the API server 1011 can acquire information about communications performed by the plurality of application containers (statistical information about communications and the like) from the node apparatuses 300.

A proxy 1012 is a proxy server that relays a container operation request transmitted from the outside of the apparatus to the API server 1011. The proxy 1012 provides functions, for example, provision of secure connection, address translation, and user authentication. The proxy 1012 is also called a K8s proxy, a kubectl proxy, or the like.

An API monitoring unit 1013 monitors a container operation request transmitted to the API server 1011.

In the present embodiment, the API monitoring unit 1013 detects that the configuration of application containers operating in a plurality of node apparatuses 300 has changed, based on the content of a container operation request transmitted to the API server 1011, and notifies the route control apparatus 200 to that effect.

Next, a flow of a process executed by the function modules described above will be described with reference to FIG. 3B.

Figure 3B:
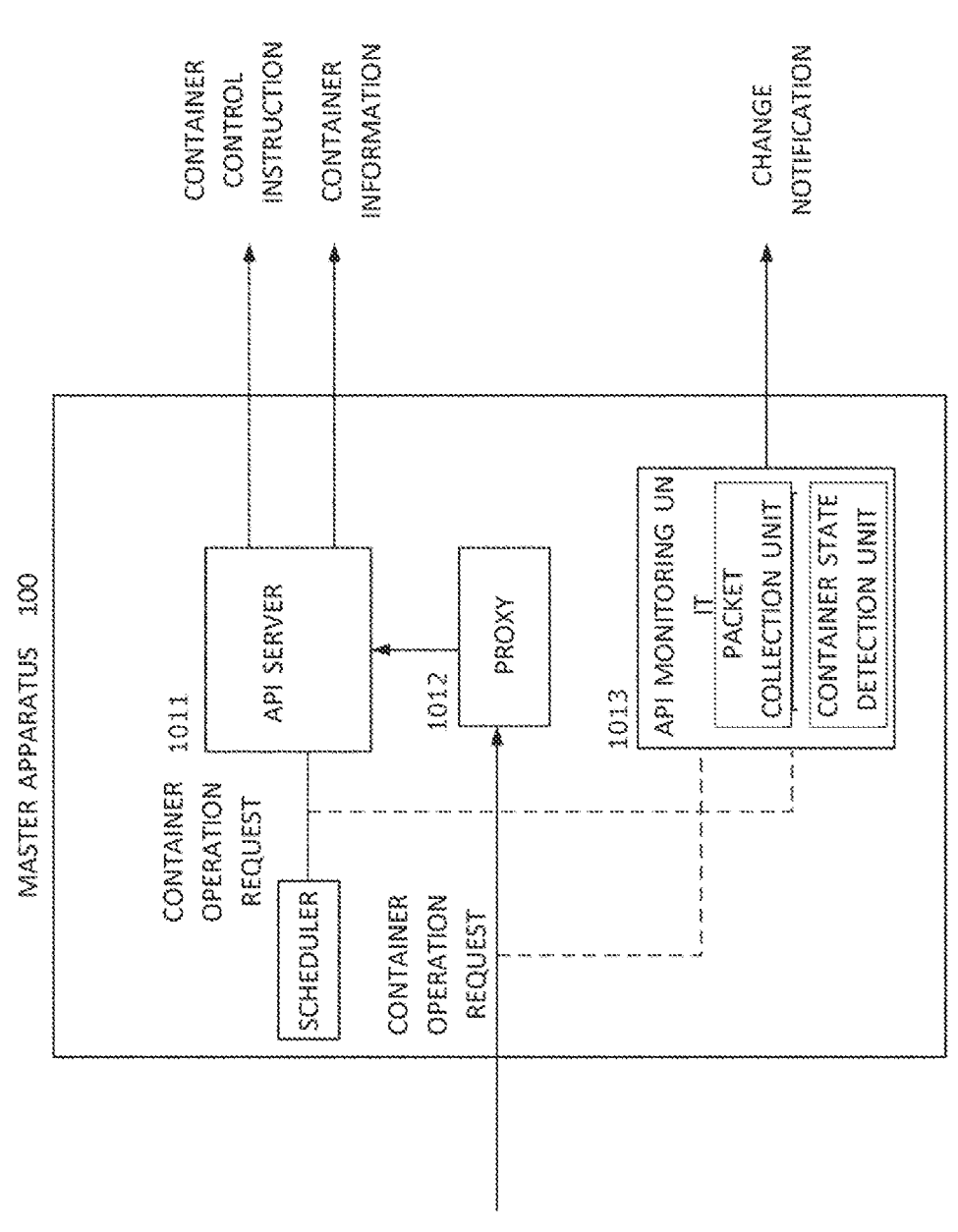
FIG. 3B is a diagram illustrating relationships among the modules of the master apparatus.

As illustrated in FIG. 3B, the master apparatus 100 receives a request for operating an application container (a container operation request) from the outside of the apparatus. The container operation request includes a message for calling the HTTP API. The container operation request is processed by the proxy 1012 and received by the API server 1011.

When acquiring the container operation request via the API, the API server 1011 generates a predetermined container control instruction and transmits the container control instruction to a corresponding node apparatus 300. The container control instruction is an instruction to instruct generation or destruction of an application container.

The API server 1011 may be connected to a scheduler that performs scheduling about generation and destruction of application containers. The scheduler associates application containers with the node apparatuses based on a requested quantity of resources, a hardware policy, an expiration date, and the like, and performs scheduling about generation and destruction of application containers.

In this case, the API server 1011 may instruct generation or destruction of a container based on a container operation request transmitted from the scheduler. That is, the container operation request may be transmitted from the outside of the apparatus or from the inside of the apparatus.

Hereinafter, the instruction issued to a node apparatus 300 by the API server 1011 will be referred to as a container control instruction. The container control instruction includes any of an instruction to generate an application container and an instruction to destroy an application container.

A container control instruction generated by the API server 1011 is received and processed by a corresponding node apparatus 300. Thereby, generation or destruction of an application container is executed in the node apparatus 300.

In the present embodiment, by directly listening to a container operation request transmitted to the API server 1011, it is detected that the configuration of application containers operating in a plurality of node apparatuses 300 has changed. Specifically, the API monitoring unit 1013 acquires a container operation request transmitted to the API server 1011 (that is, a request to call the HTTP API) and determines the content thereof.

The API monitoring unit 1013 includes a packet collection unit and a container state detection unit.

The packet collection unit reads the content of each packet transmitted from the outside of the apparatus to the API server 1011, and determines whether the packet includes a container operation request, that is, a message for calling the HTTP API is included or not. The packet collection unit acquires the packet at a kernel level at any of the following timings. At which stage the packet is to be acquired is not limited to a particular stage.

(1) A timing when the packet passes through a network interface driver;

(2) A timing when the packet is handed over from an NIC to the kernel; and (3) A timing when a network stack processes the packet.

The packet collection unit determines whether the message for calling the HTTP API is included in the acquired packet or not. Specifically, the packet collection unit performs the following processes:

(1) Performing filtering to obtain only a packet that includes an HTTP header;

(2) Collating the content of the HTTP header to confirm whether calling of the HTTP API has been performed or not;

(3) determining whether generation or destruction of a container is requested or not.

Here, if the packet includes the message for calling the HTTP API for operating a container, the API monitoring unit 1013 can determine that generation or destruction of an application container has been requested.

The container state detection unit generates information about a corresponding container (a name space and a name of the container), time information, and information about the called API and the like, based on a result of the determination performed by the packet collection unit, and stores the information. These pieces of information are included in the container operation request.

Further, the container state detection unit generates data notifying that the configuration of the containers has changed (hereinafter, a change notification) based on the stored pieces of information, and transmits the change notification to the route control apparatus 200.

Though description has been made on the case where a container operation request is transmitted from the outside of the master apparatus 100, there may be a case where a container operation request is issued by the internal scheduler as described before. In this case also, the API monitoring unit 1013 can read a packet transmitted to the API server 1011 and determine that generation or destruction of an application container has been requested, in a similar method.

Further, the API server 1011 can provide information about the plurality of application containers (hereinafter, container information) to the outside of the apparatus (for example, the route control apparatus 200). For example, the API server 1011 can transmit the container information to the route control apparatus 200 in response to an inquiry from the route control apparatus 200. The container information includes, for example, K8s cluster configuration information.

Figure 4A:
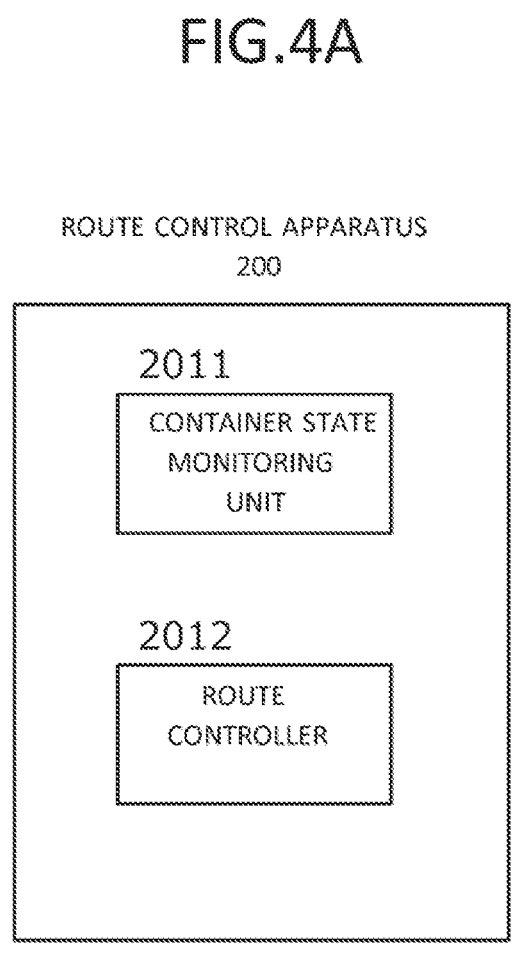

Next, function modules of the route control apparatus 200 will be described. FIG. 4A is a schematic diagram illustrating the function modules of the route control apparatus 200. Each of the illustrated function modules is executed by the controller 201.

A container state monitoring unit 2011 acquires container information from the master apparatus 100 (the API server 1011) being triggered by receiving a change notification from the master apparatus 100. The container information includes information about the configuration and states of all application containers operating in a plurality of node apparatuses 300. The collected container information is temporarily stored.

A route controller 2012 calculates optimal communication routes among the plurality of application containers based on the stored container information.

The route controller 2012 has a function of managing the configuration of a target network and a function of monitoring the situation of the network, and can calculate optimal communication routes between any nodes.

The route controller 2012 generates an optimal communication route for each of all combinations of application containers that are operating, and stores data showing the route.

Furthermore, based on the data, the route controller 2012 transmits data instructing a packet transfer route (hereinafter route control data) to each of the plurality of nodes (including the plurality of node apparatuses 300) constituting the network.

A tunnel on the virtual network in Kubernetes is set by node apparatuses 300. The route controller 2012 generates a route between node apparatuses (300) on the physical network separately from the virtual network.

Next, a process executed by the function modules of the route control apparatus 200 will be described with reference to FIG. 4B.

Figure 4B:
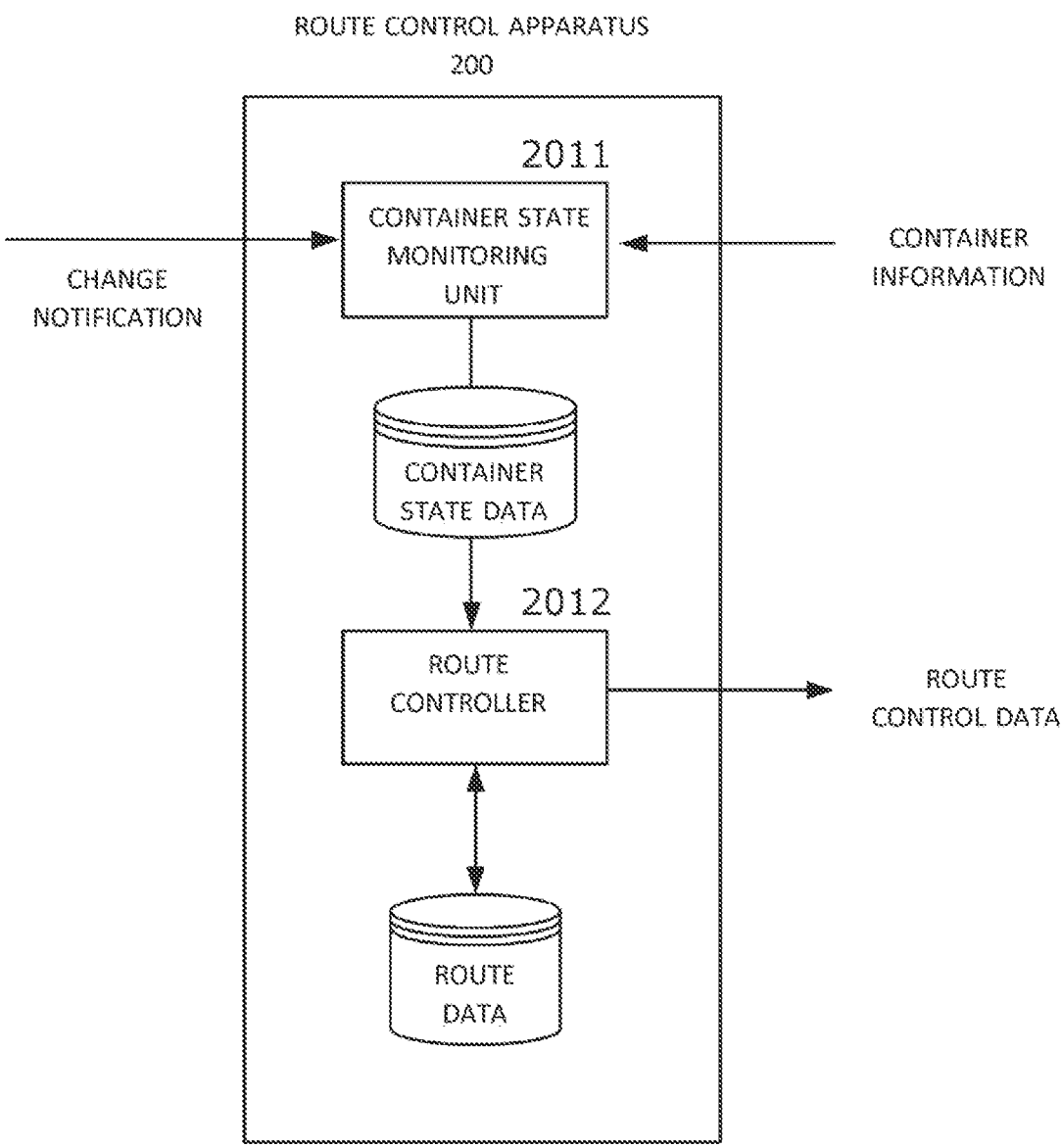
FIG. 4B is a diagram illustrating relationships among the modules of the route control apparatus.

When the route control apparatus 200 receives a change notification, the container state monitoring unit 2011 starts operation as illustrated in FIG. 4B.

The container state monitoring unit 2011 makes an inquiry to the API server 1011 being triggered by receiving the change notification, and acquires container information (for example, K8s cluster configuration information) managed by the API server 1011. The container information includes information about all application containers operating in a plurality of node apparatuses 300 included in the system. The container information may include the names, arrangement places, number, communication situations of the application containers.

The acquired container information is stored into the storage 202 as container state data.

When the container state monitoring unit 2011 acquires the container information, the process is handed over to the route controller 2012.

The route controller 2012 generates route information about optimal routes among the plurality of application containers based on network configuration information and the container information.

The network configuration information is information managed by the function of the route controller 2012 of managing the configuration of a target network.

When the container information includes the communication situation of each application container (for example, statistical information about communications performed by each application container), the route controller 2012 generates the route information in consideration of the communication situations.

When an application container is newly generated, the route controller 2012 generates a new route with the application container as a transmission source or destination. When an application container is destroyed, the route controller 2012 deletes a route with the application container as a transmission source or destination.

Thereby, route information about the whole network can be generated or updated. The route controller 2012 stores the generated or updated route information as route data.

Furthermore, the route controller 2012 transmits data specifying a packet transfer route (route control data) to each of the plurality of node apparatuses 300 included in the network based on the generated route data.

The route control data includes, for example, a combination of a transmission source node, a transmission destination node, and a transit node.

Figure 5:
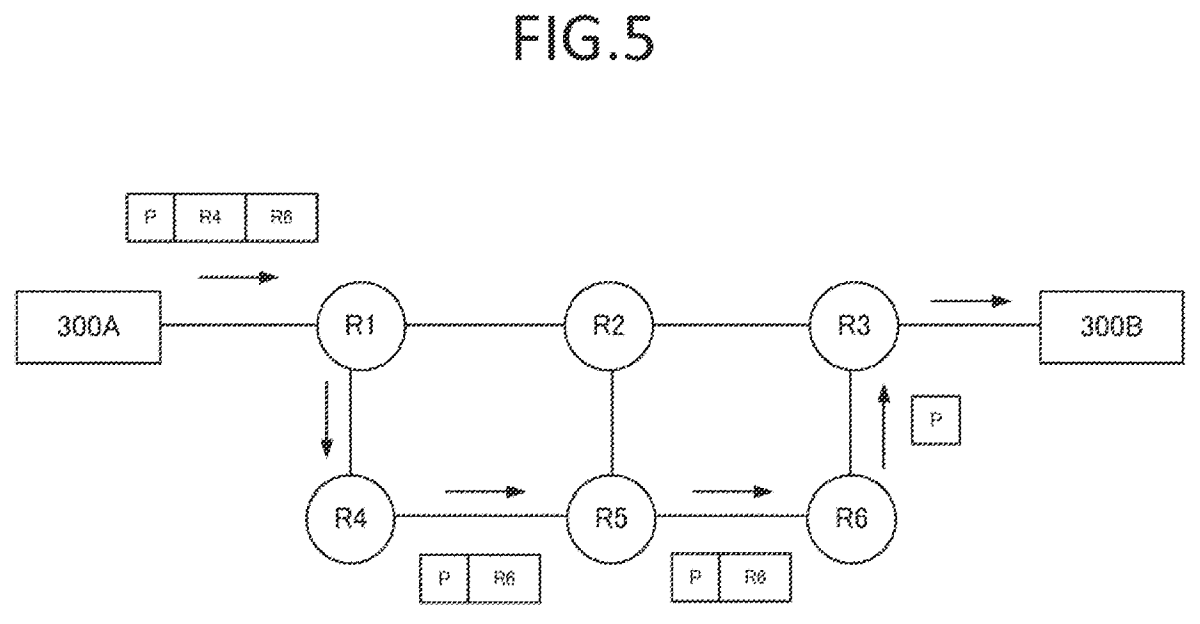

For example, it is assumed that there is a network as illustrated in FIG. 5. Nodes R1 to R6 are communication apparatuses (for example, network switches) on a packet transfer route.

Here, it is assumed that an optimal route between the node apparatus 300A which is a packet transmission source node and the node apparatus 300B which is a transmission destination node is such a route as illustrated (for example, it is assumed that the node R2 is a bottleneck). As for such nodes that are to be avoided or to be passed through, the route control apparatus 200 can grasp them based on the container information.

In this case, the route controller 2012 generates route control data to the effect that a packet is to be transmitted to the node apparatus 300B via the nodes R4 and R6, and transmits the route control data to the node apparatus 300A. Route control data may be transmitted not only to a node apparatus 300 but also to any communication apparatus included in the network.

Figure 6:
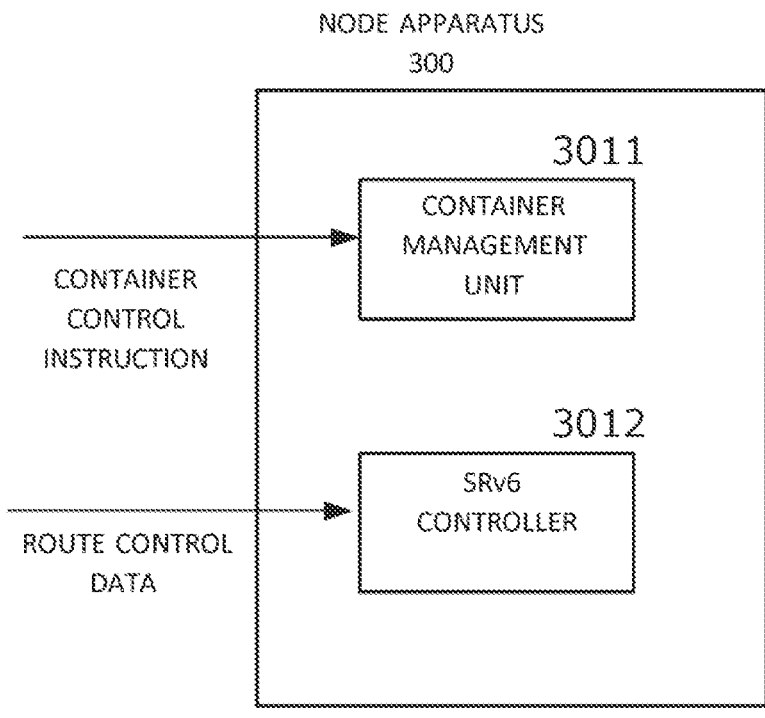
FIG. 6 is a configuration diagram of modules of a node apparatus.

FIG. 6 is a schematic diagram illustrating function modules of each node apparatus 300. Each of the illustrated function modules is executed by the controller 301.

A container management unit 3011 receives an instruction to generate or destroy an application container (a container control instruction) from the master apparatus 100 and performs generation or deletion of the application container according to the container control instruction. The container management unit 3011 may notify the master apparatus 100 of a result of generation or deletion of the application container. The container management unit 3011 operates in the application layer of the node apparatus 300.

An SRv6 controller 3012 performs a process for controlling a transfer route of a packet transmitted or received by the application container based on route control data received from the route control apparatus 200.

As described before, in Kubernetes, a plurality of application containers perform communication via virtual transmission lines. Therefore, it is necessary to control the communication routes in the network layer lower than the application layer.

Therefore, in the present embodiment, the SRv6 controller 3012 adds data for performing segment routing to packets transmitted and received by application containers. The SRv6 controller 3012 operates at the kernel level, that is, in a layer lower than the application layer (for example, the network layer) and can write data to IPv6 extension headers of packets transmitted by the application containers.

For example, in the case of the example of FIG. 5, the route controller 2012 transmits route control data that instructs the node apparatus 300A to "transmit a packet with the node apparatus 300A as a transmission source and the node apparatus 300B as a transmission destination via the nodes R4 and R6" to the node apparatus 300A.

The SRv6 controller 3012 of the node apparatus 300A, which is the transmission source node, stores the data specifying the route via the nodes R4 and R6 into the IPv6 extension header of a packet generated by the application container and sends out it to the network. By making such a configuration, it becomes possible to perform route control in the network layer that is lower.

When a node apparatus 300 receives route control data, the SRv6 controller 3012 starts operation as illustrated in FIG. 6.

The SRv6 controller 3012 relays a packet transmitted by the application container operating in the node apparatus 300. Based on the route control data received from the route control apparatus 200, the SRv6 controller 3012 sets data for performing segment routing for the packet and sends out the packet to the network. Specifically, data specifying nodes through which the packet is to pass is stored into the IPv6 extension header. The IPv6 extension header may include data specifying processing to be executed at the transit nodes.

Thereby, it becomes possible to transmit a packet through any route without influencing data generated by an application executed in a container.

Next, flowcharts of processes executed by the master apparatus 100 and the route control apparatus 200 will be described.

Figure 7:
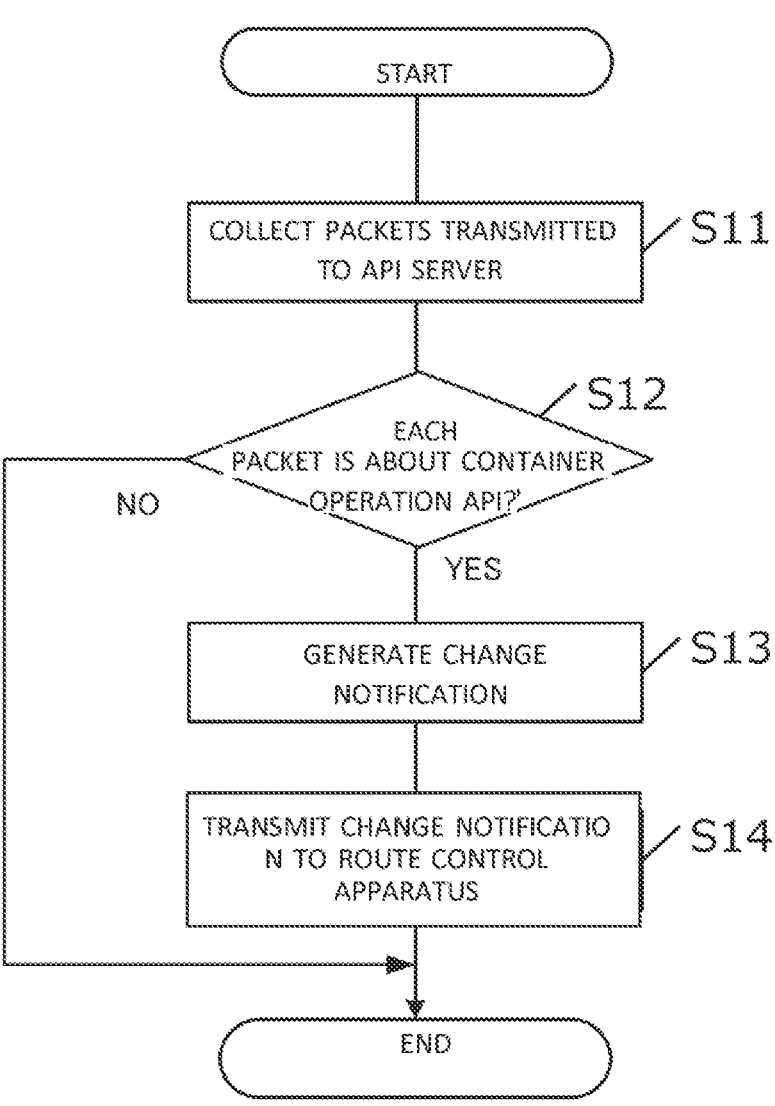
FIG. 7 is a flowchart of a process executed by the master apparatus.

FIG. 7 is the flowchart of the process executed by the master apparatus 100 (the API monitoring unit 1013).

First, at step S11, the packet collection unit collects packets transmitted to the API server 1011. The packets may be transmitted from the outside of the apparatus via the proxy 1012 or may be directly transmitted from the internal scheduler.

Next, at step S12, the container state detection unit determines whether or not each of the collected packets includes an HTTP request and is related to an API for operating a container. If a positive determination is made here, the process proceeds to step S13. If a negative determination is made, the process ends.

At step S13, the container state detection unit acquires the type of the API, a name space, and a container name included in each HTTP request, and generates a change notification that includes these pieces of information. The generated change notification is transmitted to the route control apparatus 200 at step S14.

Figure 8:
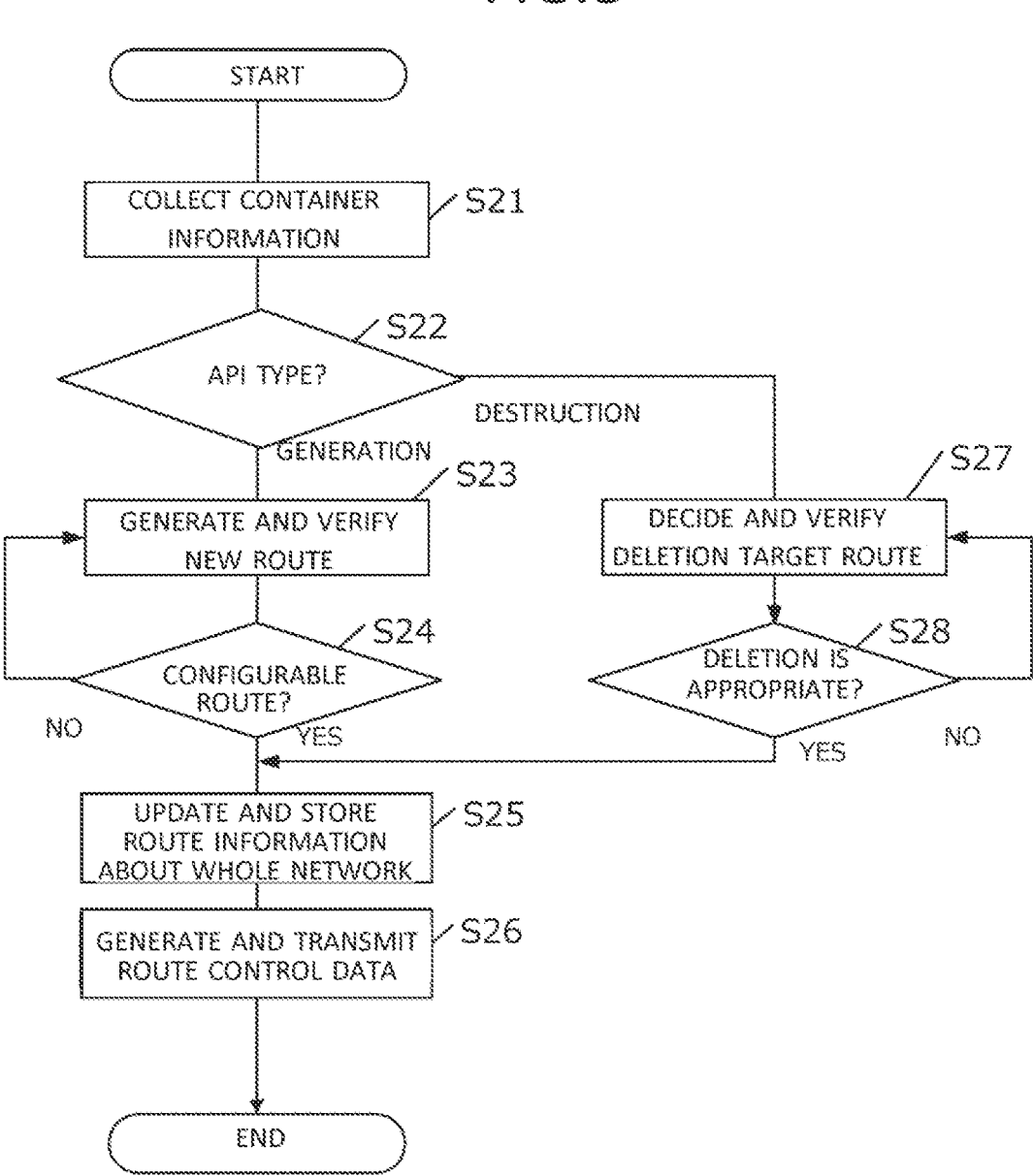
FIG. 8 is a flowchart of a process executed by the route control apparatus.

Next, details of the process executed by the route control apparatus 200 will be described. FIG. 8 is the flowchart of the process executed by the route control apparatus 200 that has received the change notification.

First, at step S21, the container state monitoring unit 2011 acquires container information. The container information can be acquired from the API server 1011 of the master apparatus 100. Thereby, the route control apparatus 200 can acquire the latest information about application containers operating in a plurality of node apparatuses 300. The acquired container information is reflected on container state data.

At this step, a process for identifying a corresponding node apparatus 300 may be executed based on the name space and the container name included in the change notification.

Next, at step S22, the route controller 2012 determines the type of the API requested from the master apparatus 100. The type of the API is any of "application container generation" and "application container destruction".

If the type of the API is "application container generation", the process proceeds to step S23, where the route controller 2012 calculates and generates a new route with a newly generated application container as a transmission source or destination and then verifies whether the route is a configurable route or not.

Here, if the generated route is configurable (step S24: Yes), the process transitions to step S25. If the generated route cannot be configured (step S24: No), the process returns to step S23, where generation of a route is performed again.

If the type of API is "application container destruction", the process transitions to step S27, where the route controller 2012 decides a route to be deleted, and verifies appropriateness of deletion of the route. Here, if deletion of the target route is appropriate (step S28: Yes), the process transitions to step S25. If deletion of the target route is not appropriate (step S28: No), the process returns to step S27, where decision of a target route is performed again.

At step S25, route information about the whole network is updated based on a result of the process at step S23 or S27. Thereby, for example, a routing table with the newly generated application container as a transmission source is added. Further, a routing table with the destroyed application container as a transmission source is deleted. At the present step, route data is updated by the route controller 2012.

At step S26, the route controller 2012 generates route control data based on the updated route data. The route control data is transmitted to all nodes that are influenced by generation and destruction of application containers.

The route control data is processed by the SRv6 controller 3012 of each of the node apparatuses 300, and, thereby, segment routing is performed.

As described above, in the first embodiment, at a timing when generation or destruction of any of application containers that operates in the plurality of node apparatuses 300 is requested, the route control apparatus updates route information about routes among the node apparatuses and specifies a data transfer route to each of the node apparatuses 300 based thereon.

In some embodiments, since the container information is managed by the master apparatus 100, routes among the node apparatuses can be determined by periodically acquiring the container information.

However, there may be a case where it is not possible to appropriately follow the life cycle of an application container depending on the timing of acquiring the container information. Further, if the cycle of acquiring the container information is too short, consumption of processing resources and traffic will be caused.

In order to cope with this, in the present embodiment, it is detected that the configuration of the application containers changes by listening to a message transmitted to the API server. According to such a configuration, it is possible to detect a change in a network situation in real time, and it becomes possible to reset a route more quickly.

Modification of First Embodiment

In the first embodiment, when the configuration of application containers changes, the route control apparatus 200 performs update of route information. However, there may be a case where a network situation changes even if the configuration of application containers does not change. Therefore, the route control apparatus 200 may update the route information when detecting such a change in the network situation.

It can be estimated that the network situation has changed, for example, based on statistical information received from network switches or statistical information about communication among the application containers. The statistical information about communication among the application containers can be acquired by the API server 1011. The API server 1011 may generate container information that includes the statistical information about communication. The route controller 2012 may acquire and store such container information that includes the statistical information.

Figure 9:
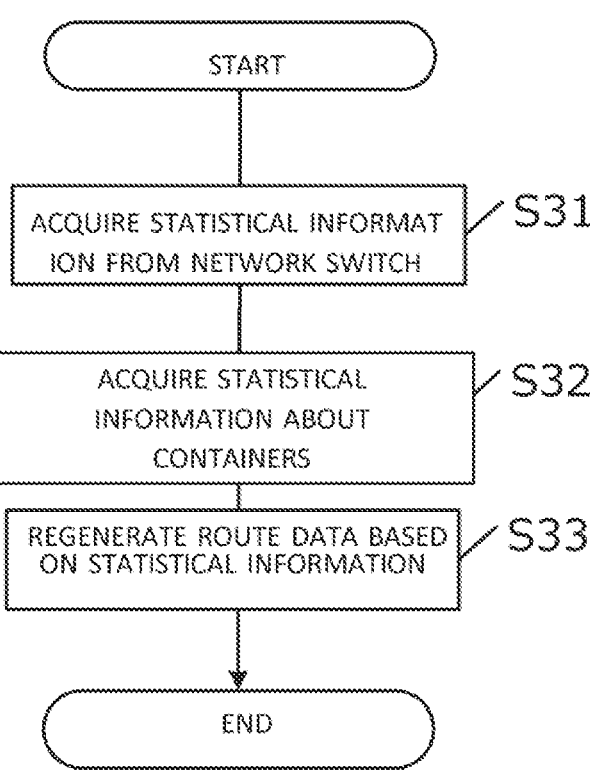
FIG. 9 is a flowchart of a process executed by the route control apparatus in the modification of first embodiment.

FIG. 9 is a flowchart of a first process executed by the route control apparatus 200 in a modification. The illustrated process can be periodically executed at a timing independent from the timing of receiving a change notification.

First, at step S31, statistical information is acquired from network switches included in the network.

Next, at step S32, statistical information about communication among the application containers is acquired from the API server 1011.

Next, at step S33, the route control apparatus 200 updates the route information based on the stored statistical information and regenerates route data.

Thereby, it is possible to detect, for example, that a lot of communication has occurred in a certain application container, and cause communication routes used by the other application containers to be diverted so as to avoid being affected by the communication.

The route control apparatus 200 may detect that a failure or congestion has occurred on the network, based on the statistical information about communication among the application containers and regenerate the route data based thereon.

Further, the route control apparatus 200 may update the route information and regenerate the route data when receiving data directly notifying that a failure or congestion has occurred on the network.

Figure 10:
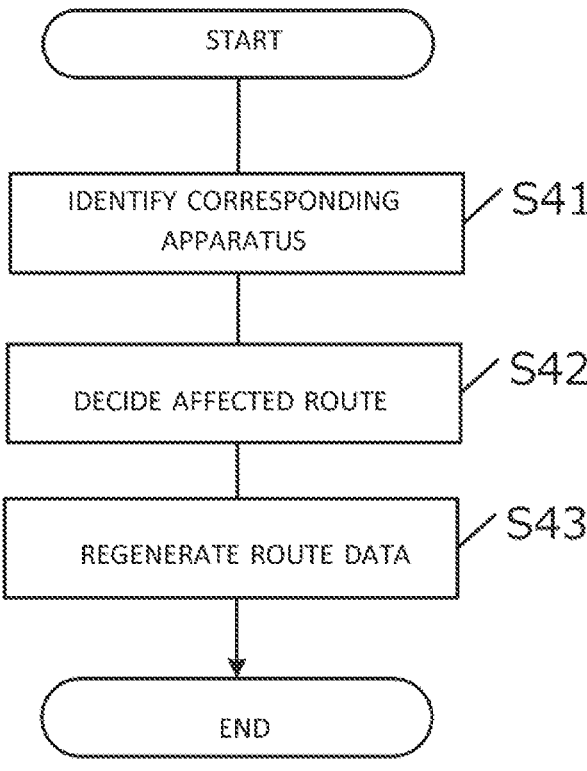
FIG. 10 is a flowchart of a process executed by the route control apparatus in the modification of first embodiment.

FIG. 10 is a flowchart of a second process executed by the route control apparatus 200 in the modification. The illustrated process is executed when the route control apparatus 200 receives data (failure data) notifying a network failure (for example, congestion). The failure data may be transmitted from a network switch or the like.

First, at step S41, a corresponding apparatus (for example, a network switch) is identified based on received failure data.

Next, at step S42, routes that are affected by the failure are identified from among routes that have been already generated.

Next, at step S43, in order to change the routes affected by the network failure, the route information is updated, and the route data is regenerated.

The route control apparatus 200 generates route control data based on the regenerated route data and transmits the route control data to corresponding node apparatuses 300.

Thus, the route control apparatus 200 may regenerate route data at any timing and transmit route control data to a plurality of node apparatuses.

(Modifications)

The above embodiments are mere examples, and the present disclosure can be appropriately changed and practiced within a range not departing from the spirit thereof.

For example, the processes and structure described in the present disclosure can be freely combined and implemented as far as technical contradiction does not occur.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing system comprising a master apparatus configured to instruct generation and destruction of a plurality of application containers that operate in a plurality of node apparatuses, respectively, and a route control apparatus configured to control routing among the plurality of node apparatuses, wherein the master apparatus comprises a first processor configured to execute:

receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus; and the route control apparatus comprises a second processor configured to, when receiving the second message, execute generating route information, for each combination of node apparatuses among the plurality of node apparatuses in which application containers are present, comprising optimal communication routes among the plurality of application containers based on stored container information.

2. The information processing system according to claim 1, wherein the first processor detects the first message from a packet received by the master apparatus.

3. The information processing system according to claim 1, wherein, when receiving the first message, the first processor transmits a third message instructing generation or destruction of the application container, to the first node apparatus.

4. The information processing system according to claim 1, wherein, when receiving the second message, the second processor generates the route information about routes among node apparatuses in which the application containers are present among the plurality of node apparatuses.

5. The information processing system according to claim 1, wherein the second processor transmits first data for performing communication route control to each of the plurality of node apparatuses, based on the route information.

6. The information processing system according to claim 5, wherein the plurality of application containers perform communication via a virtual network; and the first data is data for performing route control in a physical network.

7. The information processing system according to claim 6, wherein the first data includes route information for performing segment routing.

8. The information processing system according to claim 1, wherein the second processor acquires container information that includes information about communication situations of the application containers in the plurality of node apparatuses, from the master apparatus.

9. The information processing system according to claim 8, wherein the second processor regenerates the route information based on the container information.

10. The information processing system according to claim 8, wherein the second processor detects that congestion or a failure has occurred on a network based on the container information.

11. The information processing system according to claim 10, wherein the second processor regenerates the route information when detecting the congestion or the failure.

12. An information processing method executed by a master apparatus configured to instruct generation and destruction of a plurality of application containers that operate in a plurality of node apparatuses, respectively, and a route control apparatus configured to control routing among the plurality of node apparatuses, wherein the master apparatus executes:

receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus; and when receiving the second message, the route control apparatus executes generating route information, for each combination of node apparatuses among the plurality of node apparatuses in which application containers are present, comprising optimal communication routes among the plurality of application containers based on stored container information.

13. The information processing method according to claim 12, wherein the master apparatus detects the first message from a packet received by the master apparatus.

14. The information processing method according to claim 12, wherein, when receiving the first message, the master apparatus transmits a third message instructing generation or destruction of the application container, to the first node apparatus.

15. The information processing method according to claim 12, wherein, when receiving the second message, the route control apparatus generates the route information about routes among node apparatuses in which the application containers are present among the plurality of node apparatuses.

16. The information processing method according to claim 12, wherein the route control apparatus transmits first data for performing communication route control to each of the plurality of node apparatuses, based on the route information.

17. The information processing method according to claim 12, wherein the route control apparatus acquires container information that includes information about communication situations of the application containers in the plurality of node apparatuses, from the master apparatus.

18. The information processing method according to claim 17, wherein the route control apparatus regenerates the route information based on the container information.

19. An information processing apparatus instructing generation and destruction of a plurality of application containers that operate in a plurality of node apparatuses, respectively, the information processing apparatus comprising a processor configured to execute:

receiving a first message requesting generation or destruction of an application container among the application containers that is in a first node apparatus among the plurality of node apparatuses; and transmitting, when receiving the first message, a second message showing that a configuration of the plurality of application containers has changed, to the route control apparatus configured to generate route information, for each combination of node apparatuses among the plurality of node apparatuses in which application containers are present, comprising optimal communication routes among the plurality of application containers based on stored container information.

20. The information processing apparatus according to claim 19, wherein the processor detects the first message from a packet received by the information processing apparatus.

* * * * *